United States Patent
Hui et al.

(10) Patent No.: US 9,673,858 B2
(45) Date of Patent: Jun. 6, 2017

(54) FAST FREQUENCY-HOPPING SCHEDULE RECOVERY

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin D'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/953,997

(22) Filed: Nov. 30, 2015

(65) Prior Publication Data

US 2016/0080030 A1 Mar. 17, 2016

Related U.S. Application Data

(63) Continuation of application No. 13/669,243, filed on Nov. 5, 2012, now Pat. No. 9,236,904.

(51) Int. Cl.
| | |
|---|---|
| *H04B 1/00* | (2006.01) |
| *H04B 1/7156* | (2011.01) |
| *H04W 56/00* | (2009.01) |

(52) U.S. Cl.
CPC ........ *H04B 1/7156* (2013.01); *H04W 56/001* (2013.01)

(58) Field of Classification Search
USPC ......... 375/260, 271, 134, 133, 346; 370/329
See application file for complete search history.

(56) References Cited

U.S. PATENT DOCUMENTS

| | | | |
|---|---|---|---|
| 6,941,110 B2 | 9/2005 | Kloper et al. | |
| 2005/0068928 A1 | 3/2005 | Smith et al. | |
| 2005/0118946 A1 | 6/2005 | Colban et al. | |
| 2007/0183357 A1* | 8/2007 | Bender | H04W 8/005 370/328 |
| 2010/0177708 A1* | 7/2010 | Pandey | H04W 74/0883 370/329 |
| 2010/0220643 A1* | 9/2010 | Qi | H04W 72/005 370/312 |
| 2010/0303182 A1 | 12/2010 | Daneshrad et al. | |

(Continued)

FOREIGN PATENT DOCUMENTS

AU 2011202556 A1 6/2011

OTHER PUBLICATIONS

Pillay-Esnault et al., "OSPFv3 Graceful Restart", Network Working Group, Request for Comments 5187, Jun. 2008, 7 pages, The IETF Trust.

(Continued)

*Primary Examiner* — Wednel Cadeau
(74) *Attorney, Agent, or Firm* — Parker Ibrahim & Berg LLC; James M. Behmke; Stephen D. LeBarron

(57) ABSTRACT

In one embodiment, a device determines a need to resynchronize a broadcast and unicast frequency-hopping schedules on its network interface. In response to the need, the device may solicit the broadcast schedule from one or more neighbor devices having the synchronized broadcast schedule, and then establishes the unicast schedule for the network interface using communication during the synchronized broadcast schedule.

14 Claims, 8 Drawing Sheets

(56) References Cited

U.S. PATENT DOCUMENTS

| | | |
|---|---|---|
| 2011/0075704 A1* | 3/2011 | Bettendorff ............ H04B 1/713 375/133 |
| 2012/0155511 A1 | 6/2012 | Shaffer et al. |
| 2013/0016757 A1 | 1/2013 | Hui et al. |
| 2013/0016758 A1 | 1/2013 | Hui et al. |
| 2013/0022084 A1 | 1/2013 | Vasseur et al. |
| 2013/0094536 A1 | 4/2013 | Hui et al. |

OTHER PUBLICATIONS

Winter et al., "RPL:IPv6 Routing Protocol for Low-Power and Lossy Networks", Request for Comments 6550, Mar. 2012, 157 pages, The IETF Trust.

Kuhl et al., "Notification of Transmittal of the International Search Report and Written Opinion of the International Searching Authority, or the Declaration", Patent Cooperation Treaty, International Application No. PCT/US2013/067442, Mailed Feb. 7, 2014, 10 pages, European Patent Office, Rijswijk, Netherlands.

* cited by examiner

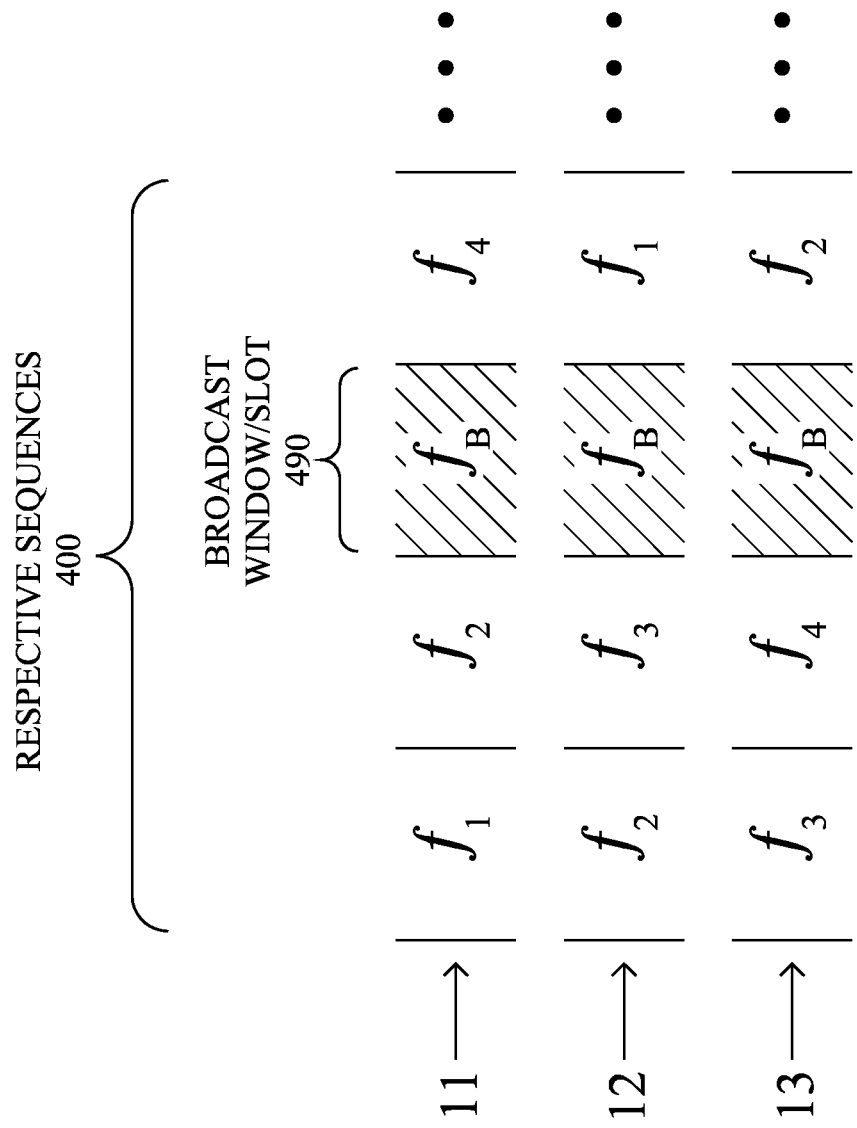

FAST FREQUENCY-HOPPING SCHEDULE RECOVERY

RELATED APPLICATION

The present application is a Continuation Application of U.S. patent application Ser. No. 13/669,243, filed Nov. 5, 2012, entitled FAST FREQUENCY HOPPING SCHEDULE RECOVERY, by Jonathan W. Hui et al., the contents of which is hereby incorporated by reference.

TECHNICAL FIELD

The present disclosure relates generally to computer networks, and, more particularly, to re-synchronizing frequency-hopping schedules.

BACKGROUND

Mesh networks are composed of two or more electronic devices, each containing at least one transceiver. The electronic devices use their transceivers to communicate with one another and/or a central device. If the device wishes to communicate with another device that is out of transmission range, the device may communicate via multi-hop communication through other devices. In a frequency-hopping (or channel-hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time.

Existing systems optimize for both unicast and broadcast communication by synchronizing the entire network to the same channel-switching schedule and using a central coordinator to compute and configure channel schedules for each individual device. However, this method adds significant delay and communication overhead to coordinate new schedules between each transmitter-receiver pair. Other systems provide a hybrid approach, where the communication is divided between independently scheduled unicast schedules and a shared broadcast transmission schedule.

To maximize channel capacity in such a hybrid system, neighboring devices must synchronize their unicast schedules and network-wide broadcast schedule to sub-millisecond accuracy. Existing mechanisms allow devices to achieve this accuracy under normal operation, using a crystal oscillator to maintain an accurate free-running time source. Devices may also compute the clock drift rates and temperature effects to compensate for inaccuracies in the oscillator's frequency. However, if a device experiences a power cycle or reboot, time synchronization is lost since the free-running clock has been disturbed and memory containing information about the neighbors' schedules is reset. Such events may occur due to a simple power glitch, a managed reboot (e.g., firmware upgrade), or unmanaged reboots (e.g., watchdog reset, accidentally removing/inserting the line card, etc.). While the device could simply rejoin the network as if it were a new node powering on, doing so incurs significant latency.

The most disruptive case is when a Field Area Router (FAR) needs to reset its interface facing a low-power and lossy network (LLN). Because the FAR's LLN interface serves as the source of the broadcast schedule, resetting the FAR's LLN interface can cause the FAR to establish a new broadcast schedule. Unfortunately, it takes time for the LLN devices to discover and synchronize to the new broadcast schedule and disrupts any existing broadcast communication. In addition, the FAR's LLN interface must also establish a new unicast schedule after a reset. Neighboring devices rely on unicast communication to not only forward data messages but also to evaluate the link quality. Without quickly discovering the new unicast schedule, devices may erroneously declare the link as down and the routing topology begins to fall apart. Accordingly, though inconvenient for any device to become de-synchronized in a frequency-hopping network, resetting the LLN interface of a FAR can take hours for nodes to rejoin the network and days for the routing topology to optimize itself.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4D illustrate example frequency hopping sequences.

DESCRIPTION OF EXAMPLE EMBODIMENTS

Overview

Figure 1:
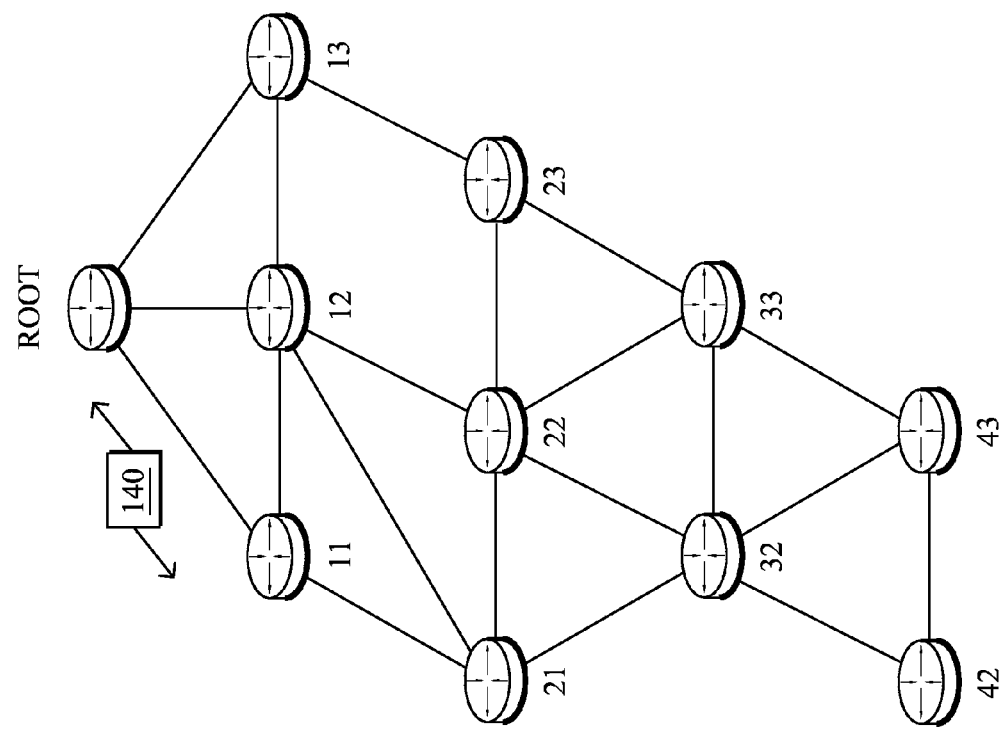
FIG. 1 illustrates an example communication network.

According to one or more embodiments of the disclosure, a device determines a need to resynchronize a broadcast and unicast frequency-hopping schedules on its network interface. In response to the need, the device may solicit the broadcast schedule from one or more neighbor devices having the synchronized broadcast schedule, and then establishes the unicast schedule for the network interface using communication during the synchronized broadcast schedule.

According to one or more additional embodiments of the disclosure, a device may receive a notice that a neighbor device has an impending de-synchronization of its broadcast and unicast frequency-hopping schedules with an expected time for the impending de-synchronization. In response to an awaited expiration of the expected time, the device may then asynchronously unicast a message with resynchronization information for the broadcast and unicast schedules to the neighbor device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "43") interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure. In addition, a network management server (NMS), or other head-end application device located beyond the root device (e.g., via a WAN), may also be in communication with the network 100.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
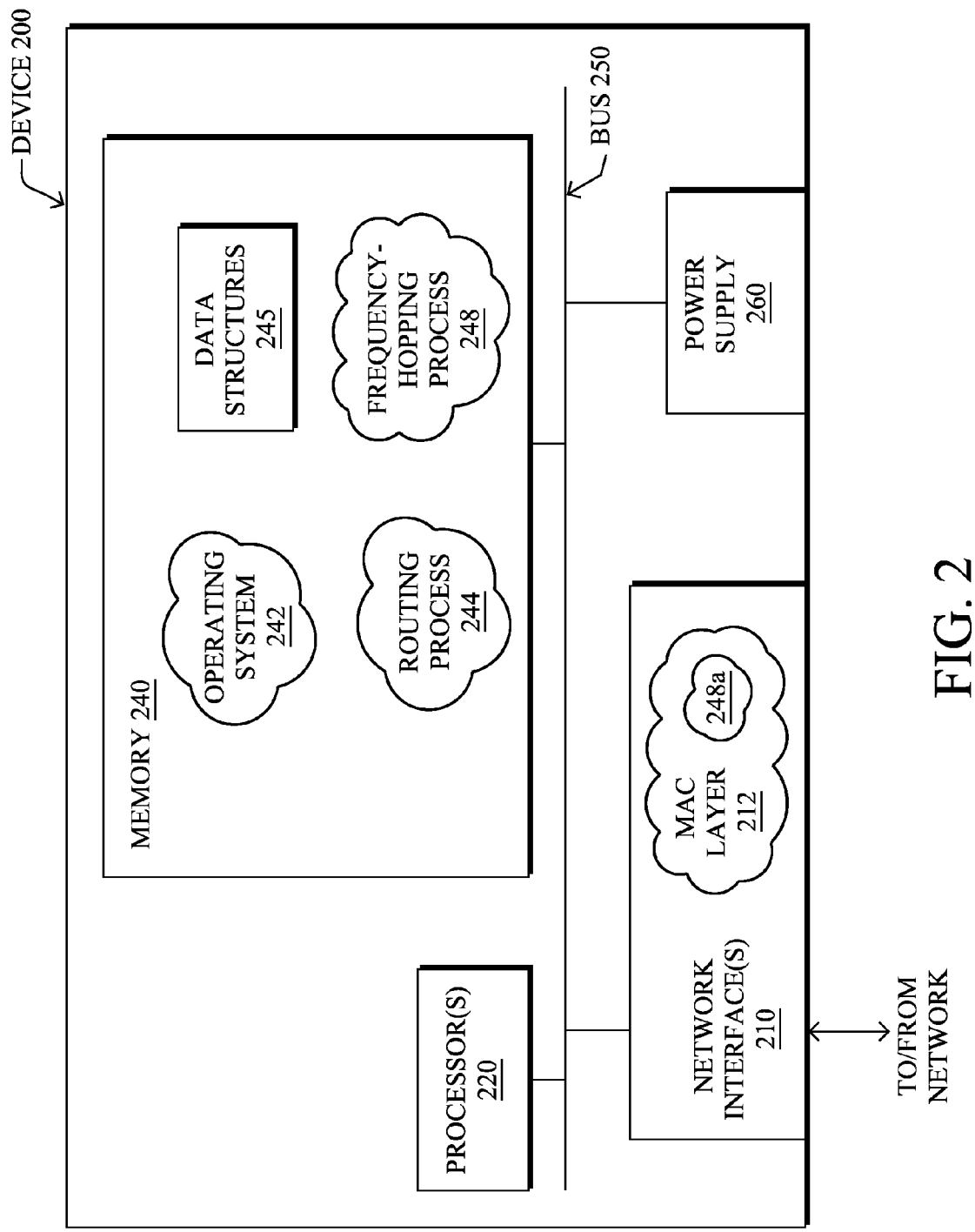
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, contain the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative frequency-hopping process 248 as described in greater detail below. Note that while frequency hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the is industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Figure 3:
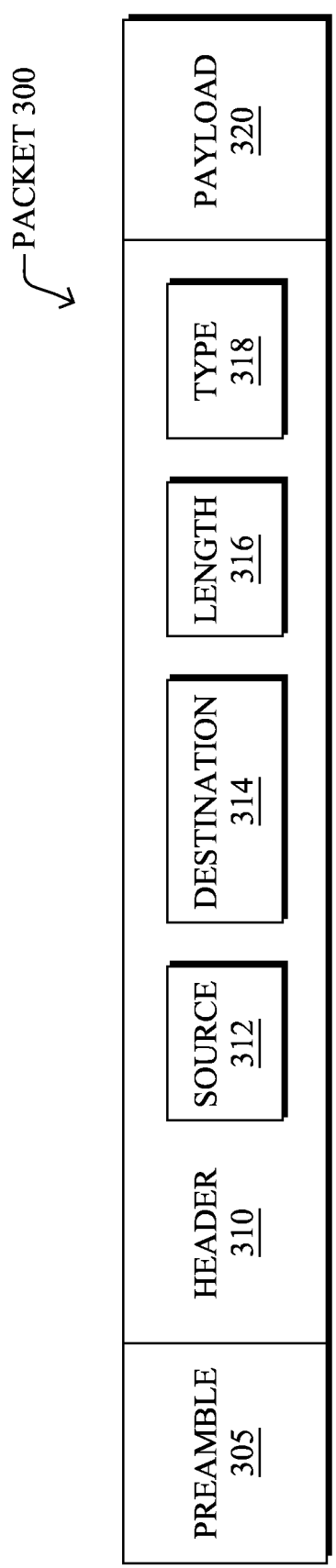
FIG. 3 illustrates an example wireless message/packet.

FIG. 3 illustrates an example simplified message/packet format 300 that may be used to communicate information between nodes 200 in the network. For example, message 300 illustratively comprises a header 310 with one or more fields such as a source address 312, a destination address 314, a length field 316, a type field 318, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and is synchronize to it, accordingly.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 4A:
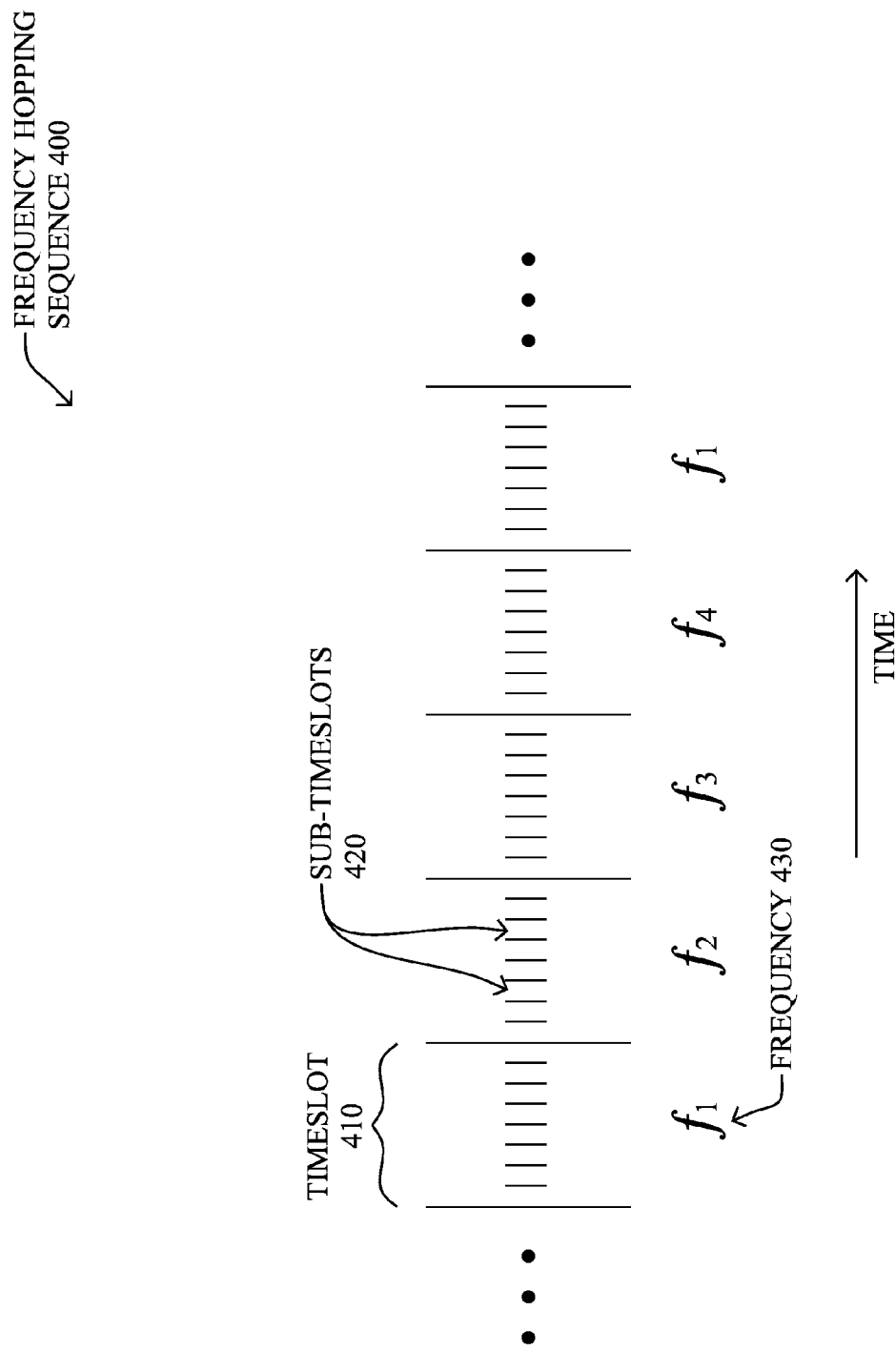

In particular, as shown in FIG. 4A, in frequency-hopping wireless networks, time frames are divided within a frequency-hopping sequence 400 into regular timeslots 410, each one operating on a different frequency 430 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 410 may be further divided into sub-timeslots 420. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4B:
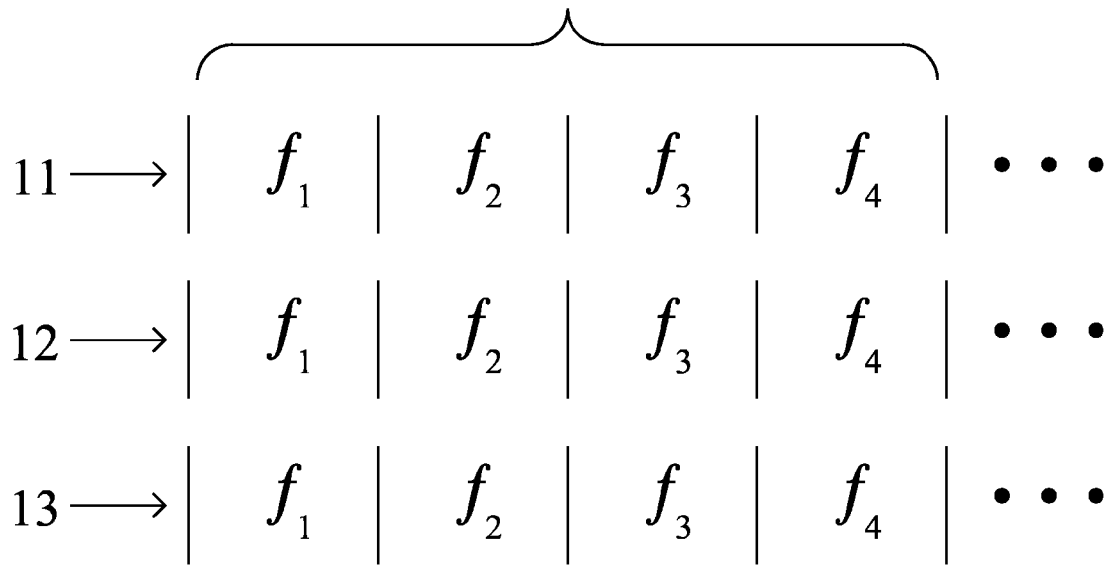

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4B, in which each receiver (e.g., 11, 12, and 13) may be configured with the same sequence (assume also that other nodes 200 within network 100 may use the same sequence).

Figure 4C:
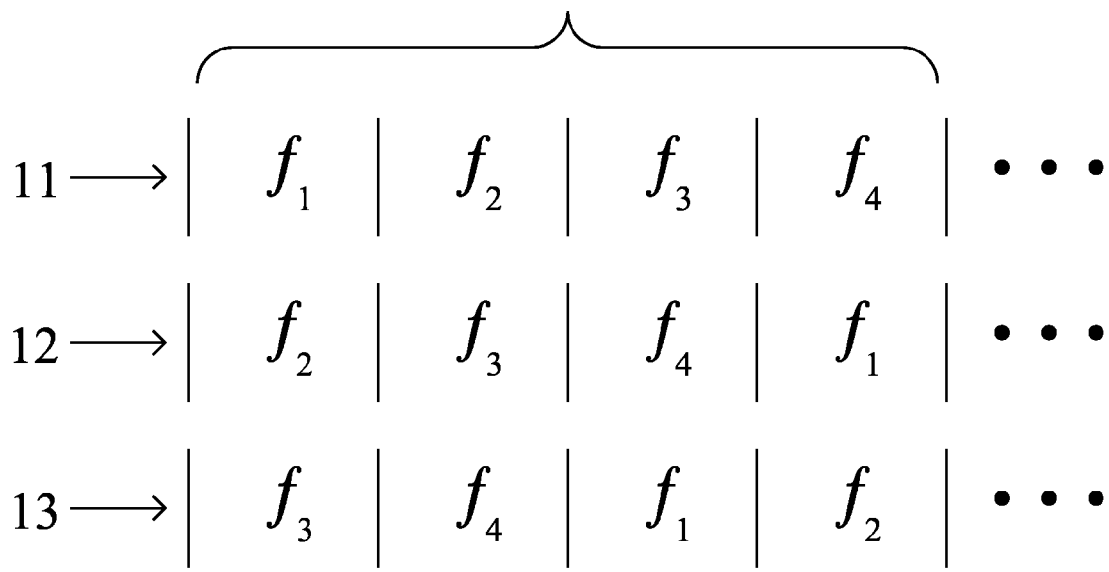

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4C. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Mesh networks typically utilize both unicast and broadcast communication. Applications use unicast communication to communicate data to a central server (e.g., AMI meter reads) or configure individual devices from a central server (e.g., AMI meter read schedules). Network control protocols use unicast communication to estimate the quality of a link (e.g., RSSI and ETX), request configuration information (e.g., DHCPv6), and propagate routing information (e.g., RPL DAO messages).

Applications use multicast communication for configuring entire groups efficiently (e.g., AMI meter configurations based on meter type), firmware download to upgrade (e.g., to upgrade AMI meter software to a newer version), and power outage notification. Network control protocols use multicast communication to discover neighbors (e.g., RPL DIO messages, DHCPv6 advertisements, and IPv6 Neighbor Solicitations) and disseminate routing information (e.g., RPL DIO messages).

Existing systems optimize for both unicast and broadcast communication by synchronizing the entire network to the same channel-switching schedule and using a central coordinator to compute and configure channel schedules for each individual device. For example, a first channel-hopping network may schedule all nodes to receive on the same channel at the same time, and the entire network hops together in lock-step. While this first network is optimized for broadcast, it does not allow frequency diversity for unicast where different pairs of nodes may communicate at the same time on different channels. In a second example network, both unicast and broadcast slots may be utilized, where a central gateway device computes the hopping schedule for each transmitter-receiver pair. However, this method adds significant delay and communication overhead to coordinate new schedules between each transmitter-receiver pair as the schedules are distributed using the wireless network. Each of these two example networks fail to is optimize the schedule for both unicast and broadcast communication without the need for centrally computing schedules for individual nodes.

In an illustrative frequency-hopping network (e.g., a Connected Grid Mesh (CG-Mesh)) a frequency-hopping technique may be implemented in which each interface determines its own unicast receive schedule, and neighboring devices may synchronize with its unicast schedule to properly communicate a unicast frame. By having each device determine their own schedule independently, neighboring transmitter-receiver pairs may communicate simultaneously on different channels. This illustrative network also overlays a network-wide broadcast schedule, where all devices are synchronized to the same frequency-hopping schedule. For example, the broadcast schedule may only active for a fraction of the time (e.g., 25%), but may allow efficient broadcasts because a single transmission can reach an arbitrary number of neighbors. This hybrid approach allows this illustrative network (e.g., the CG-Mesh) to maximize spectral efficiency for unicast communication while also allowing efficient broadcast communication.

FIG. 4D illustrates an example of a broadcast slot/window 490 (e.g., $f_B$) overlaid within the frequency-hopping sequences of FIG. 4C above. Note that while the broadcast slot 490 is shown as aligning with the individual unicast timeslots, the broadcast timeslot need not match any unicast timeslot boundaries. Also, the unicast timeslot boundaries in FIGS. 4A-4D need not align between devices (e.g., between 11, 12, or 13), and the simplified view shown herein is merely for illustration.

As noted above, if a device experiences a power cycle or reboot, time synchronization is lost since the free-running clock has been disturbed and memory containing information about the neighbors' schedules is reset. Such events may occur due to a simple power glitch, a managed reboot (e.g., firmware upgrade), or unmanaged reboots (e.g., watchdog reset, accidentally removing/inserting the line card, etc.). While the device could simply rejoin the network as if it were a new node powering on, doing so incurs significant latency.

As also mentioned above, the most disruptive case is when a Field Area Router (FAR) needs to reset its interface facing an LLN. Because the FAR's LLN interface serves as the source of the broadcast schedule, resetting the FAR's LLN interface can cause the FAR to establish a new broadcast schedule. Unfortunately, it takes time for the LLN devices to discover and synchronize to the new broadcast schedule and disrupts any existing broadcast communication. In addition, the FAR's LLN interface must also establish a new unicast schedule after a reset. Neighboring devices rely on unicast communication to not only forward data messages but also to evaluate the link quality. Without quickly discovering the new unicast schedule, devices may erroneously declare the link as down and the routing topology begins to fall apart. Accordingly, though inconvenient for any device to become de-synchronized in a frequency-hopping network, resetting the LLN interface of a FAR can take hours for nodes to rejoin the network and days for the routing topology to optimize itself.

Fast Frequency-Hopping Schedule Recovery

The techniques herein minimize disruptions caused by resetting a network interface, and allow a device to re-synchronize with an existing broadcast schedule. Doing so allows the device (e.g., particularly a FAR) to avoid having to establish a new broadcast schedule, which disrupts the network. As described herein, the techniques allow the network interface to either establish a new unicast schedule quickly or obtain its old unicast schedule. Certain embodiments herein also utilize notification of interface resets and re-synchronization to quickly reestablish link quality metrics and preferred routes. Further, the techniques provide for "planned" interface resets, by preparing neighboring devices for resynchronization.

Illustratively, the techniques described herein may be performed by hardware, software, and/or firmware, such as in accordance with the frequency-hopping process 248/248a, which may contain computer executable instructions executed by the processor 220 (or independent processor of interfaces 210) to perform functions relating to the techniques described herein. For example, the techniques herein may be treated as extensions to conventional protocols, such as the various frequency-hopping protocols (e.g., of MAC layer 212), and as such, may be processed by similar components understood in the art that execute those protocols, accordingly.

Operationally, the techniques herein first involves having the network interface quickly obtain the existing broadcast schedule, if one exists. As described above, the FAR serves as the source of the broadcast schedule. As a result, network interfaces cannot simply establish a new broadcast schedule when they reset. While it may be feasible for the FAR to establish a new broadcast schedule, doing so is extremely disruptive to the network.

In one embodiment, the network interface may solicit the broadcast schedule using an asynchronous broadcast (which involves transmitting across all available channels). To mitigate a response implosion, responders may delay their response by a random backoff. The solicit message may also include additional information such as filters, random window size, etc. to assist in mitigating response implosion. The response may also be sent using an asynchronous broadcast so that other neighboring network interfaces can determine that the request was satisfied and suppress their own responses.

In another embodiment, the network interface may opportunistically solicit the broadcast schedule by sending a broadcast message to a subset of channels (whereas the asynchronous broadcast sends to all available channels). The hope is that at least one neighbor receives the message. In very dense networks, the network interface may send a single broadcast to a single channel. Opportunistically sending to one or small number of channels not only reduces channel utilization but also mitigates the response implosion issue, since fewer nodes will receive the solicitation. The probability of at least one neighbor receiving the opportunistic transmission(s) can be modeled by:

$P(1)=1-(1-1/C)^N$ # the probability for 1 transmission
$P(k)=1-(1-P(1))^k$ # the probability for k transmissions where C is the number of available channels and N is the number of neighbors. Below are some example numbers:

C=64, N=100, P(1)=79.29%, P(2)=95.7%, P(3)=99.11%
C=36, N=100, P(1)=93.5%, P(2)=99.6%
C=11, N=100, P(1)=99.9%

The 64 channel case is typical of IEEE 802.15.4g in North America. The 36 channel case is typical of IEEE 802.15.4g in Brazil. The 11 channel case is typical of IEEE 802.15.4g in Hong Kong. Note in very sparse networks, the network interface may utilize asynchronous broadcast instead. The network may choose between 1 and N channels depending on the density and a reliability threshold.

In yet another embodiment, the network interface may solicit the broadcast schedule using an asynchronous unicast (which also involves transmitting across all available channels). Transmitting across all channels helps ensure that the neighbor will receive the message regardless of the channel it is listening on. While the unicast approach avoids the response implosion problem completely, it requires the network interface to have knowledge of a neighboring node's address. In some cases, the FAR/host may be able to provide a list of neighbors (e.g., in the case when the FAR/host simply resets the WPAN interface).

It is possible to apply additional optimizations when the FAR/host resets the WPAN interface. In one embodiment, the FAR/host actually maintains a rough synchronization with the broadcast schedule. Note that in many cases, the FAR cannot maintain sufficiently accurate time synchronization due to timing jitter introduced by the kernel. But by maintaining a rough synchronization, the FAR/host can help the network interface avoid a full asynchronous broadcast/unicast. With a rough estimate of the schedule, the network interface may send one or more synchronous broadcast messages. The network device need only send enough broadcast messages to ensure that it satisfies the expected error bounds of the rough synchronization. The goal is to have a synchronous broadcast received by one of the neighbors during the actual broadcast schedule. The response then allows the network interface to tighten its synchronization back to sub-millisecond accuracy. A similar technique may be used to synchronously unicast a message based on a rough synchronization with a unicast schedule, too.

Using IEEE 802.15.4e, the solicit may illustratively be in the form of an Enhanced Beacon Request and the response as an Enhanced Beacon. The Enhanced Beacon contains an Information Element that includes the broadcast schedule information, allowing the network interface to resynchronize to the broadcast schedule.

A second aspect of the techniques herein involves having the network interface quickly establish a new unicast schedule or resynchronize to its old one. In both cases, the network device first synchronizes with the broadcast schedule as described in the first component.

In one embodiment, the network interface establishes a new unicast schedule and transmits an Enhanced Beacon during a broadcast slot. The Enhanced Beacon contains an Information Element with the interface's unicast schedule. Any device receiving the Enhanced Beacon synchronizes to the new unicast schedule. Because the Enhanced Beacon is sent during a broadcast slot, a single transmission can reach an arbitrary number of neighbors, which is especially important in dense environments. The benefit of this approach is that it is simple and only requires one transmission to resynchronize with an arbitrary number of neighbors. The downside is that some neighbors may not properly receive the message.

In another embodiment, the network interface attempts to obtain its old unicast schedule in the same way that it obtained its broadcast schedule. The device could broadcast a message to solicit information about its old schedule, dealing with the response implosion as described above. If the device is aware of some neighbors, it could also unicast a message to solicit its old unicast schedule information. The benefit of re-synchronizing to its old schedule is that other neighboring devices need not receive any new information. The downside of this approach is that it may incur additional latency or messaging if solicit and/or replies are dropped.

A third aspect of the techniques herein involves utilizing the messaging above to notify other components that a re-synchronization has occurred. One area where this can be very beneficial is in maintaining link quality metrics. When a network interface resets, any neighboring node trying to communicate with it may degrade their link quality metric for that link. Obtaining notification that the device has reset and re-synchronized can reset the link quality metrics to their original values, acknowledging that the earlier transmission failures were due to a transient failure. Another area is when performing fast re-routing. When using a protocol such as the Routing Protocol for LLNs (RPL), devices may maintain multiple next-hop parents. When a network device notices that a link may be down, it will begin routing packets to a different parent (even though it may not be the preferred parent). However, a notification that the network interface was reset and has resynchronized can cause the routing protocol to reinstate the preferred parent again.

Still another aspect of the techniques herein allows a network interface to prepare a network for an upcoming de-synchronization. This planned operation is useful in cases where the reset is known beforehand (e.g., firmware upgrade, scheduled reboot, etc.). When using this "planned" reset mode, a network interface selects a subset (e.g., 2 or 3) neighbors to inform them that the network interface is about to reset, with a time estimate of when the network interface will be back up. The time estimate may be specified as a relative value (e.g., duration from now) or as an absolute time. The neighboring devices wait until the network interface is expected to be back up and sends an asynchronous unicast message to provide the synchronization information for both broadcast and unicast schedules. The time estimate also provides a useful indication on when neighboring devices should begin looking for alternative routes, if the network interface does not come back up as expected.

Figure 5:
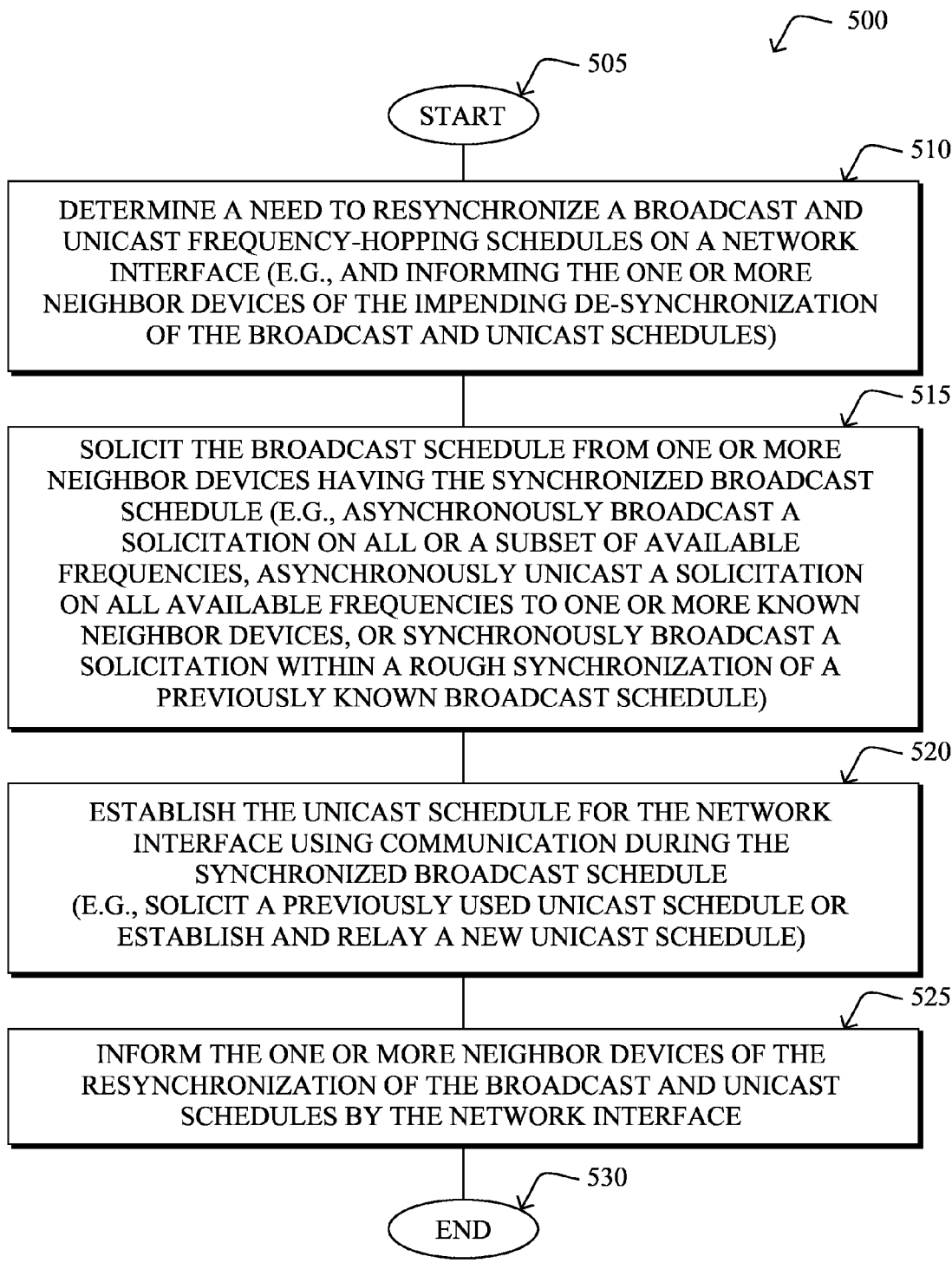
FIG. 5 illustrates an example simplified procedure for fast frequency-hopping schedule recovery in a communication network, particularly from the perspective of a de-synchronized device.

FIG. 5 illustrates an example simplified procedure 500 for fast frequency-hopping schedule recovery in a communication network in accordance with one or more embodiments described herein, particularly from the perspective of a de-synchronized device. The procedure 500 may start at step 505, and continues to step 510, where, as described in greater detail above, a network device, such as an LLN device or a FAR, determines a need to resynchronize a broadcast and unicast frequency-hopping schedules on a network interface. Note that in the instance that the need is determined before an impending de-synchronization, the process 500 may further include informing neighbor devices of the impending de-synchronization of the broadcast and unicast schedules, e.g., along with an expected time for the impending de-synchronization. In this manner, the network interface essentially pre-solicits an asynchronous unicast message with resynchronization information for the broadcast and unicast schedules to be sent to the network interface after the impending de-synchronization, as described above.

In step 515, in response to the need (when not pre-solicited) the device solicits the broadcast schedule from one or more neighbor devices having the synchronized broadcast schedule. For instance, as described in greater detail above, the solicitation may be:

asynchronously broadcasted on all available frequencies (e.g., while mitigating responses from the one or more neighbor devices through use of at least one of either filters or random window sizes for the asynchronously broadcasted solicitation);

asynchronously broadcasted on a subset of all available frequencies (e.g., determined based on one or more factors such as neighbor density, number of available frequencies, and a reliability threshold);

asynchronously unicasted on all available frequencies to one or more known neighbor devices;

synchronously broadcasted within a rough synchronization of a previously known broadcast schedule; or synchronously unicasted within a rough synchronization of a previously known unicast schedule (note, in this instance, the request may be specifically for a broadcast and/or unicast schedule).

Once the broadcast schedule is recovered (or discovered), then in step 520 the device may establish the unicast schedule for the network interface using communication during the synchronized broadcast schedule. For example, as described above, the device may solicit a previously used unicast schedule from one or more neighbor devices having is the unicast schedule of the network interface, or else may establish a new unicast schedule for the network interface and relay the new unicast schedule to one or more neighbor devices during the synchronized broadcast schedule, accordingly.

In one embodiment mentioned above, in step 525 the device may inform the one or more neighbor devices of the resynchronization of the broadcast and unicast schedules by the network interface, such as to protect link quality metrics, etc. The procedure 500 illustratively ends in step 530.

Figure 6:
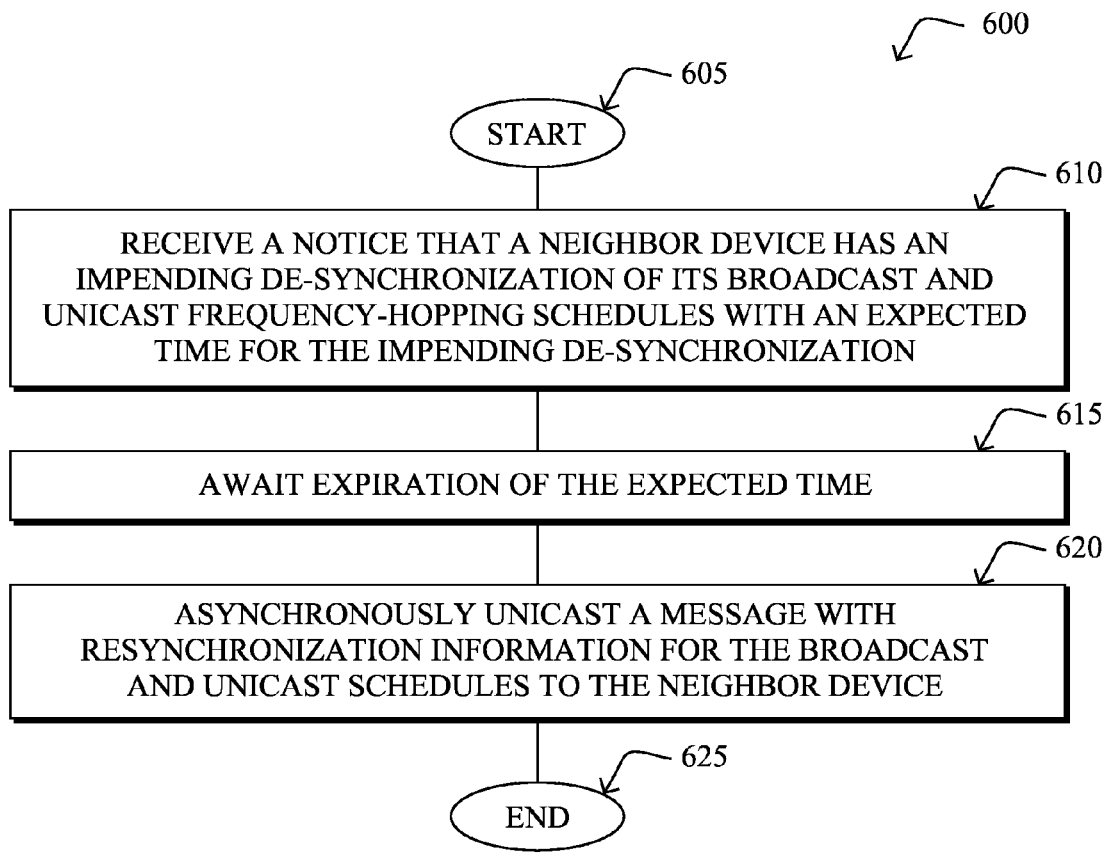
FIG. 6 illustrates another example simplified procedure for fast frequency-hopping schedule recovery in a communication network, particularly from the perspective of a synchronized device.

In addition, FIG. 6 illustrates another example simplified procedure 600 for fast frequency-hopping schedule recovery in a communication network in accordance with one or more embodiments described herein, particularly from the perspective of a synchronized device. The procedure 600 may start at step 605, and continues to step 610, where, as described in greater detail above, a device receives a notice that a neighbor device has an impending de-synchronization of its broadcast and unicast frequency-hopping schedules with an expected time for the impending de-synchronization. After awaiting expiration of the expected time in step 615, the device may then asynchronously unicast a message with resynchronization information for the broadcast and unicast schedules to the neighbor device in step 620, and the illustrative procedure 600 ends in step 625.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for fast frequency-hopping schedule recovery in a communication network. In particular, the techniques herein minimize disruptions caused by resetting a network interface, particularly for LLN devices. For instance, if the FAR's LLN interface experiences a reset, it can take hours for nodes to rejoin the network and days for the routing topology to optimize and return to its previous state. The resets may be due to a power glitch, managed reset (e.g., firmware upgrade), or unmanaged reset (e.g., watchdog reset, accidentally removing/inserting the line card, etc.). Such reset errors happen more often than expected and can be very disruptive, especially on a FAR that serves as the root for thousands of LLN devices. The techniques herein, therefore, alleviate the need to completely rebuild the LLN topology during such de-synchronization.

While there have been shown and described illustrative embodiments that provide for fast frequency-hopping schedule recovery in a communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of shared-media networks and/or protocols that operate according to frequency-hopping (or channel-hopping) schedules. In addition, while certain protocols are shown, such as RPL, other suitable protocols may be used, accordingly.

Note also, that while the above description generally related to a node or FAR that was already part of a network that needed to "re-"synchronize, it is contemplated that nodes joining a network for the first time may also use certain aspects of the techniques described above to quickly obtain the frequency-hopping schedules.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a particular device in a computer network, a notice that a neighbor device has an impending de-synchronization of one or more of its broadcast and unicast frequency-hopping schedules with an expected time for the impending de-synchronization;
   awaiting, by the particular device, expiration of the expected time;
   in response to expiration of the expected time, asynchronously unicasting, by the particular device, a message with resynchronization information for the one or more broadcast and unicast schedules to the neighbor device, wherein asynchronously unicasting the message involves transmitting the message across all available channels to the neighbor device;
   receiving a solicitation from the neighbor device for an existing broadcast schedule stored on the particular device via an asynchronous broadcast sent from the neighbor device on a subset of all available frequencies wherein the subset is determined by the neighbor device based on neighbor density; number of available frequencies; or a reliability threshold, or via an asynchronous unicast sent from the neighbor device on all available frequencies to one or more known neighbor devices of the neighbor device; and
   in response to receiving the solicitation, transmitting from the particular device the existing broadcast to the neighbor device.

2. The method as in claim 1, further comprising:
   receiving a notice at the particular node that the one or more broadcast and unicast frequency hopping schedules are being resynchronized.

3. The method as in claim 1, further comprising:
   receiving a solicitation from the neighbor device for an existing broadcast schedule stored on the particular device via synchronous broadcast from the neighbor device within an estimated synchronization of a previously known broadcast schedule; and
   in response to receiving the solicitation, transmitting the existing broadcast to the neighbor device.

4. The method as in claim 1, further comprising:
   receiving a solicitation from the neighbor device for an existing broadcast schedule stored on the particular device via synchronous unicast from the neighbor device within an estimated synchronization of a previously known unicast schedule; and
   in response to receiving the solicitation, transmitting the existing broadcast to the neighbor device.

5. The method as in claim 1, further comprising:
   receiving from the neighbor device a solicitation for a previously used unicast schedule;
   determining whether the particular device has the previously used unicast schedule of the particular node; and
   in response to determining that the particular device has a previously used unicast schedule for the neighbor device, transmitting the previously used unicast schedule to the neighbor device.

6. The method as in claim 1, further comprising:
   receiving from the neighbor device a new unicast schedule during a recovered broadcast schedule.

7. The method as in claim 1, further comprising:
   receiving a pre-solicitation of an asynchronous unicast message with resynchronization information for the one or more broadcast and unicast frequency hopping schedules to be sent to a network interface of the neighbor device after the impending de-synchronization.

8. The method as in claim 1, wherein the particular device receives solicitations in the form of enhanced beacon requests.

9. An apparatus, comprising:
   a network interface to communicate with a frequency-hopping communication network;
   a processor coupled to the network interface and adapted to execute one or more processes; and
   a memory configured to store a process executable by the processor, the process when executed operable to:
      receive a notice that a neighbor device has an impending de-synchronization of one or more of its broadcast and unicast frequency-hopping schedules with an expected time for the impending de-synchronization;

await expiration of the expected time;

in response to expiration of the expected time, asynchronously unicast a message with resynchronization information for the one or more broadcast and unicast schedules to the neighbor device, wherein asynchronously unicasting the message involves transmitting the message across all available channels to the neighbor device;

receiving a solicitation from the neighbor device for an existing broadcast schedule stored on the particular device via an asynchronous broadcast sent from the neighbor device on a subset of all available frequencies wherein the subset is determined by the neighbor device based on neighbor density; number of available frequencies; or a reliability threshold, or via an asynchronous unicast sent from the neighbor device on all available frequencies to one or more known neighbor devices of the neighbor device; and in response to receiving the solicitation, transmitting from the particular device the existing broadcast to the neighbor device.

10. The apparatus as in claim 9, wherein the process when executed is further operable to:

receive a notice that the one or more broadcast and unicast frequency hopping schedules are being resynchronized.

11. The apparatus as in claim 9, wherein the process when executed further operable to:

receive a solicitation from the neighbor device for an existing broadcast schedule stored on the apparatus via synchronous broadcast from the neighbor device within an estimated synchronization of a previously known broadcast schedule; and in response to receiving the solicitation, transmit the existing broadcast to the neighbor device.

12. The apparatus as in claim 9, wherein the process when executed further operable to:

receive from the neighbor device a solicitation for a previously used unicast schedule;

determine whether the apparatus has the previously used unicast schedule of the particular node; and in response to a determination that the apparatus has a previously used unicast schedule for the neighbor device, transmitting the previously used unicast schedule to the neighbor device.

13. The method as in claim 1, wherein the process when executed further operable to:

receive a pre-solicitation of an asynchronous unicast message with resynchronization information for the one or more broadcast and unicast frequency hopping schedules to be sent to a network interface of the neighbor device after the impending de-synchronization.

14. A tangible, non-transitory, computer-readable media having software encoded thereon, the software, when executed by a processor on an apparatus, operable to:

receive a notice that a neighbor device has an impending de-synchronization of one or more of its broadcast and unicast frequency-hopping schedules with an expected time for the impending de-synchronization;

await expiration of the expected time;

in response to expiration of the expected time, asynchronously unicast a message with resynchronization information for the one or more broadcast and unicast schedules to the neighbor device, wherein asynchronously unicasting the message involves transmitting the message across all available channels to the neighbor device;

receive a solicitation from the neighbor device for an existing broadcast schedule stored on the particular device via an asynchronous broadcast sent from the neighbor device on a subset of all available frequencies wherein the subset is determined by the neighbor device based on neighbor density; number of available frequencies; or a reliability threshold, or via an asynchronous unicast sent from the neighbor device on all available frequencies to one or more known neighbor devices of the neighbor device; and in response to receiving the solicitation, transmitting from the particular device the existing broadcast to the neighbor device.

* * * * *